US011168220B2

(12) United States Patent
White et al.

(10) Patent No.: US 11,168,220 B2
(45) Date of Patent: Nov. 9, 2021

(54) CORROSION INHIBITING SELF-PROTECTING COATINGS

(71) Applicant: The Board of Trustees of the University of Illinois, Urbana, IL (US)

(72) Inventors: Scott R. White, Champaign, IL (US); Nancy R. Sottos, Champaign, IL (US); Michael T. Odarczenko, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 319 days.

(21) Appl. No.: 15/814,948

(22) Filed: Nov. 16, 2017

(65) Prior Publication Data
US 2018/0141313 A1 May 24, 2018

Related U.S. Application Data

(60) Provisional application No. 62/423,861, filed on Nov. 18, 2016.

(51) Int. Cl.
*C09D 5/08* (2006.01)
*C09D 163/00* (2006.01)
(Continued)

(52) U.S. Cl.
CPC .............. *C09D 5/08* (2013.01); *B05D 7/14* (2013.01); *C08K 5/101* (2013.01); *C08K 5/132* (2013.01);
(Continued)

(58) Field of Classification Search
CPC . C08K 9/10; C08K 5/08; C08K 5/132; C08K 5/101; C09D 5/08; C09D 5/082; C09D 5/086; C09D 5/084
See application file for complete search history.

(56) References Cited

U.S. PATENT DOCUMENTS 5,070,174 A * 12/1991 Ohba ................ C08G 81/00
528/104
7,569,625 B2 * 8/2009 Keller .............. B29C 73/163
427/387

(Continued)

OTHER PUBLICATIONS

Watkins et al., Formulating High-Performance Waterborne Epoxy Coatings. Sep. 11-12, 2006 (Year: 2006).*

(Continued)

*Primary Examiner* — Monique R Jackson
(74) *Attorney, Agent, or Firm* — Haukaas Fortius PLLC; Michael H. Haukaas

(57) ABSTRACT

The corrosion of unprotected steel substrates causes damage that is costly to repair or replace. Current protective coatings predominately rely on environmentally harmful anticorrosive agents and toxic solvents to protect the underlying substrate. The use of lawsone (2-hydroxy-1,4-napthoquinone) together with a environmentally benign epoxy coating provides an environmentally-friendly alternative for common protective coatings. Microencapsulated lawsone embedded coatings allows the anticorrosive agent to remain dormant until released by damage and is then deposited directly onto the steel substrate. Both visual and electrochemical analysis shows that this self-protective scheme leads to 60% corrosion inhibition in a neutral salt water solution.

18 Claims, 15 Drawing Sheets

A

Microcapsule with shell wall and core solution

B

Epoxy coating

C

Solid protective barrier

(51) Int. Cl.
| | |
|---|---|
| B05D 7/14 | (2006.01) |
| C08K 9/10 | (2006.01) |
| C09D 163/04 | (2006.01) |
| C08L 63/00 | (2006.01) |
| C08K 5/101 | (2006.01) |
| C08K 5/132 | (2006.01) |
| C08K 5/00 | (2006.01) |

(52) U.S. Cl.
CPC ............ *C08L 63/00* (2013.01); *C09D 163/00* (2013.01); *C09D 163/04* (2013.01); *B05D 2202/10* (2013.01); *C08K 5/0025* (2013.01); *C08K 9/10* (2013.01)

(56) References Cited

U.S. PATENT DOCUMENTS

| | | | |
|---|---|---|---|
| 2007/0166542 A1* | 7/2007 | Braun | B29C 73/163 428/402.21 |
| 2009/0181254 A1 | 7/2009 | White et al. | |
| 2015/0267061 A1* | 9/2015 | Huesmann | C09D 171/00 428/418 |

OTHER PUBLICATIONS

Rani, Green Inhibitors, 2012, International Journal of Corrosion, Hindawi Publishing Corporation, vol. 12, Article ID 380217. (Year: 2012).*

Montemor, Chapter 6: Fostering Green Inhibitors for Corrosion Prevention, Mar. 2016, In: Hughes, Mol, Zheludkevich, Buchheit (eds) Active Protective Coatings. Springer Series in Materials Science, vol. 233, pp. 107-137. (Year: 2016).*

Cho et al., "Self-Healing Polymer Coatings," Adv. Mater., 21:645-649, Jan. 2009.

Edussuriya et al., "Inhibition Action of Lawsone on Corrosion of Mild Steel in Acidic Media," The Online J. Sci. Technol., 2(2):32-36, Apr. 2012.

El-Etre et al., "Corrosion Inhibition of Some Metals Using Lawsonia Extract," Corros. Sci., 47(2):385-395, Feb. 2005.

Garcia et al., "Self-Healing Anticorrosive Organic Coating Based on an Encapsulated Water Reactive Silyl Ester: Synthesis and Proof of Concept," Prog. Org. Coat., 70(2-3):142-149, Feb.-Mar. 2011.

Li et al., "Autonomous Indication of Mechanical Damage in Polymeric Coatings," Adv. Mater., 28(11):2189-2194, Mar. 2016.

Ostovari et al., "Corrosion Inhibition of Mild Steel in 1m Hcl Solution by Henna Extract: A Comparative Study of the Inhibition by Henna and Its Constituents (Lawsone, Gallic Acid, Alpha-D-Glucose and Tannic Acid)," Corros. Sci., 51(9): 1935-1949, Sep. 2009.

Robb et al., "A Robust Damage-Reporting Strategy for Polymeric Materials Enabled by Aggregation-Induced Emission," ACS Cent Sci., 2(9):598-603, Sep. 2016.

Vimalanandan et al., "Redox-responsive Self-Healing for Corrosion Protection," Adv Mater., 25(48):6980-6984, Dec. 2013.

Wan Nik et al., "Study of Henna (*Lawsonia inermis*) as Natural Corrosion Inhibitor for Aluminum Alloy in Seawater," IOP Conf. Series:Materials Science and Engineering (ICMER2011), IOP Publishing, 36(1):1-7, Sep. 2012.

Zheludkevich et al., "Active Protection Coatings with Layered Double Hydroxide Nanocontainers of Corrosion Inhibitor," Corros. Sci., 52(2):602-611, Feb. 2010.

* cited by examiner

C

D

CORROSION INHIBITING SELF-PROTECTING COATINGS

RELATED APPLICATIONS

This application claims priority under 35 U.S.C. § 119(e) to U.S. Provisional Patent Application No. 62/243,861, filed Nov. 18, 2016, which is incorporated herein by reference.

BACKGROUND OF THE INVENTION

The steel used in bridges, automobiles, or pipelines is vulnerable to corrosion damage unless protected from environmental exposure. Protective coatings and corrosion inhibitors are used to prevent or slow the damage that occurs due to corrosion and reduce the costs associated with repair and replacement of damaged coatings and substrates. Protective coatings rely on solvents and other compounds that contain high volatile organic compounds (VOC). These chemicals are: binders, coalescing agents, plasticizers, freeze/thaw stabilizers, defoamers, surfactants, and viscosity modifiers. During the drying and curing process, the release of VOC is noticed by unpleasant odors, possible skin or eye irritants, and allergic reactions.

Defined by the EPA in 1970, VOC are chemicals released in the atmosphere that undergo photochemical reactions releasing environmentally harmful peroxides and ozone, including those from paints and coating applications. The coating material used in this work contains water as the dispersing solvent with no VOC. Corrosion inhibitors, used in combination with protective coatings, slow the corrosion process by inhibition of specific corrosion mechanisms. Some common corrosion inhibition additives include zinc, phosphates, and chromates. However, zinc and phosphates are harmful for humans and the environment, and chromates have been mostly banned due to their carcinogenicity.

The industry standard for incorporating a corrosion inhibitor into a coating is by direct addition. While this approach is straightforward, the inhibitor may not be directly exposed upon damage to the coating, potentially limiting its effectiveness. Similarly, coating materials have been fabricated to have an intrinsic anticorrosion or self-healing mechanism such as a sol-gel or a water activated polyelectrolyte coating. However, these coatings lack the structural integrity of other coating materials (e.g. epoxy coatings). Another approach to corrosion inhibition, is to encapsulate the desired inhibitor and embed the capsules in the coating. The inhibitor chemical agent (e.g. anticorrosive, antibacterial, self-healing) remains sequestered and protected within the capsule until released by damage to the coating. Modified nanoparticles are commonly employed to contain the anticorrosive agent. Shchukin et al. (*Adv. Materials,* 2006, 18(13), 1672) applies polyelectrolyte layers to silica nanoparticles, and during the process the anticorrosive agent becomes entrapped within the multiple layers. Upon corrosion damage, the anticorrosive agent is released to prevent further corrosion. Self-healing coatings can autonomously prevent corrosion by repairing coating damage whenever and wherever it occurs. However, the timescale for repair may be too slow to fully prevent corrosion from proceeding and the environmental stability of self-healing is still challenging. Similarly, another strategy is the addition of a self-reporting functionality in coatings using embedded microcapsules. However, the release of damage indicators cannot repair coating damage or prevent the corrosion process.

Other problems associated with self-healing materials arise from the toxic substances in the composition. Non-toxic substances may not compatible when added directly into polymer compositions because those can adversely affect their curing properties. Thus, a solution for an environmentally friendly self-healing composition is needed.

SUMMARY

The present disclosure provides a microcapsule based self-protecting coating comprising an encapsulated "green" protective agent that remains dormant inside a microcapsule. One such "green" anticorrosive agent used was lawsone (2-hydroxy-1,4-napthoquinone), an extract of the henna plant and an anticorrosive agent. Upon damage to the microcapsules within the coating, lawsone is released and immediately protects the underlying steel substrate. Lawsone is a ligand that chelates with metal cations, forming insoluble metal complexes as shown in FIG. 1 that adsorb onto the metal surface to provide a protective barrier between the steel substrate and the corrosive solution. Lawsone is one of the main components of henna extract and is safe for humans and the environment, as evidenced by the use of henna for recreational tattoos and skin markings in medical applications. The self-protecting coating described herein provides an environmentally safe form of corrosion protection.

Accordingly, this disclosure provides an environmentally friendly self-protecting barrier composition comprising:

a) a plurality of activatable microcapsules;

b) a corrosion inhibitor having negligible environmental toxicity, wherein the corrosion inhibitor is inside one or more of the activatable microcapsules; and c) an environmentally benign polymerizable matrix that cures when coated on a substrate, wherein the activatable microcapsules are dispersed in the environmentally benign polymerizable matrix, the activatable microcapsules release the corrosion inhibitor when activated by physical damage to the activatable microcapsule, and the corrosion inhibitor in the environmentally benign polymerizable matrix provides an environmentally friendly self-protecting barrier composition that has negligible toxicity to the environment.

Additionally, this disclosure also provides a method of forming a corrosion inhibiting composite with the self-protecting barrier composition disclosed herein, the method comprising:

a) applying a coating of the self-protecting barrier composition to a metal substrate, wherein the corrosion inhibitor is a metal complexing agent; and b) curing the self-protecting barrier to form a composite of the metal substrate and the cured self-protecting barrier;

wherein the activatable microcapsules in the cured self-protecting barrier release the corrosion inhibitor when a damaging event to the composite occurs, and wherein the released corrosion inhibitor complexes to the surface of the metal substrate upon contact, thereby inhibiting corrosion.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
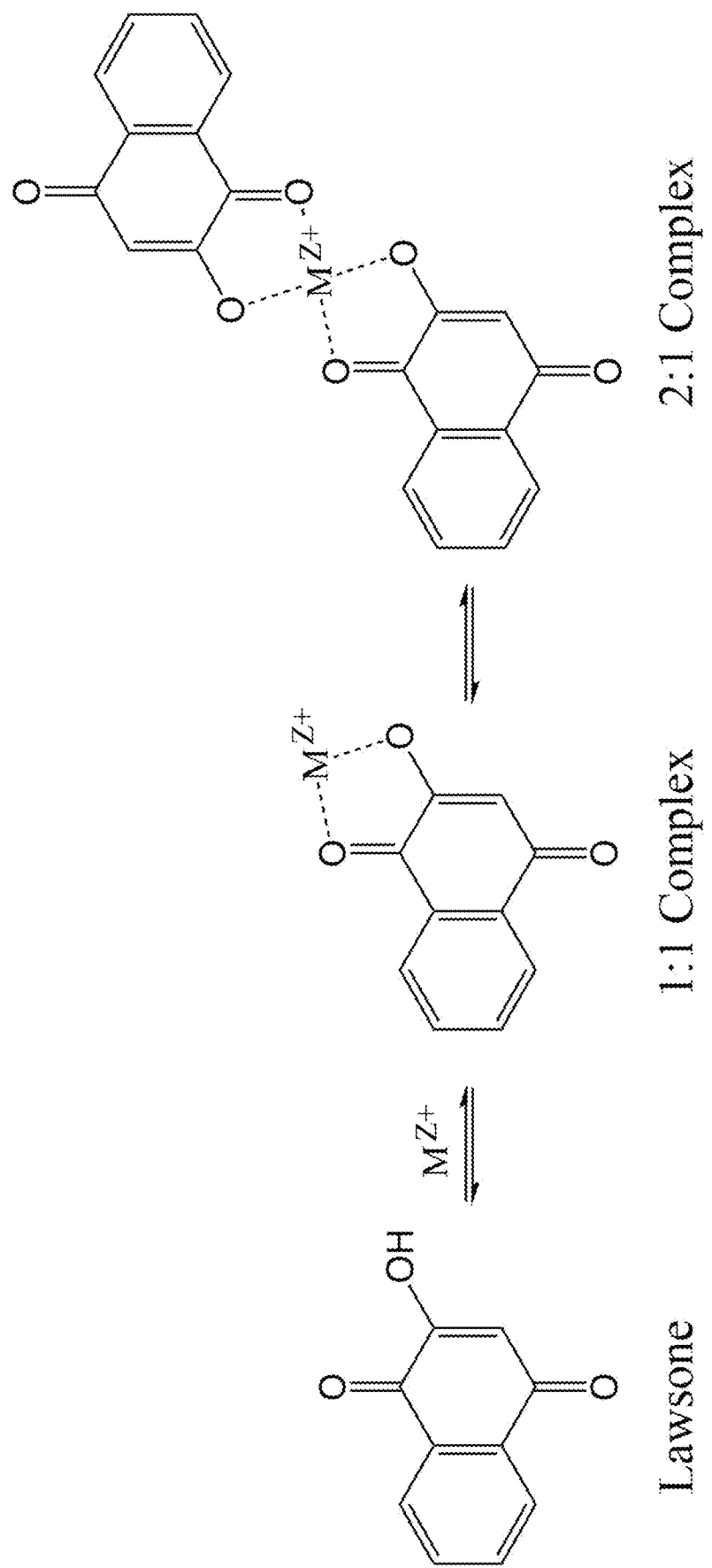
FIG. 1. The lawsone structure interacts with a metal ion (M) during the corrosion process and forms a 1:1 or 2:1 metal complex where Z=1,2,3.

Herein disclosed is a self-protecting polymer coating with a microencapsulated anticorrosion agent distributed throughout the coating. Lawsone (2-hydroxy-1,4-napthoquinone), an extract of the henna plant, has known anticorrosive properties based on the chelation of metal cations. The metal complexes formed (FIG. 1) adsorb onto the underlying metal surface and form a protective barrier. Lawsone is one of the main components of henna extract and gives the extract its orange-brown color. Lawsone is safe for humans and the environment, and is used for recreational tattoos and skin markings in medical procedures. Lawsone in combination with a water-based coating provide an environmentally-friendly protective coating for steel substrates.

Figures 2A, 2B, 2C:
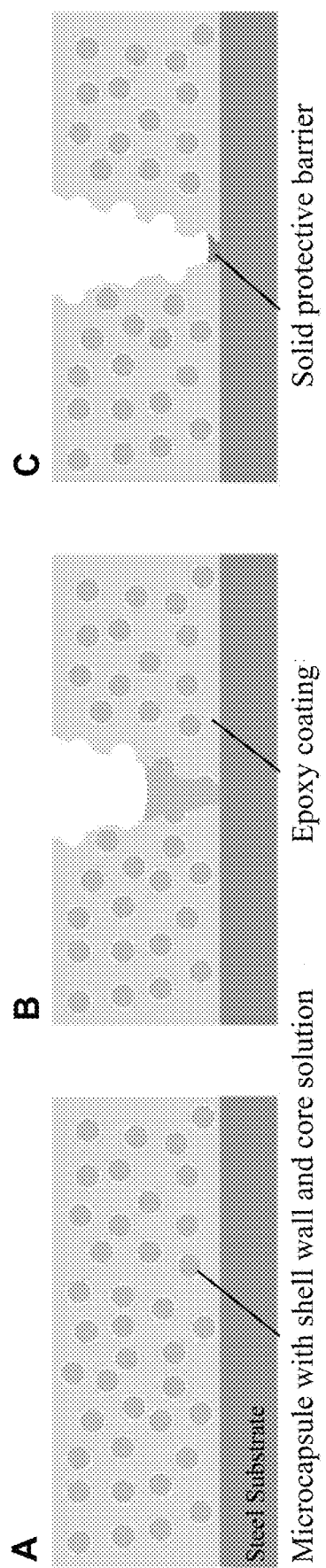
FIG. 2A-2C. Self-protecting coating. (a) Undamaged coating with embedded microcapsules containing an anticorrosive agent (e.g. lawsone). (b) Mechanical damage ruptures embedded capsules releasing their content into the damage area. (c) Evaporation and diffusion of the carrier solvent produces a solid protective barrier that passivates and protects the underlying steel substrate.

Our self-protecting coating (FIG. 2) utilizes microencapsulated lawsone distributed throughout the coating. Capsules containing the green anticorrosive agent (lawsone and core solvent) are initially embedded in a coating on a steel substrate. Upon mechanical damage to the coating, the microcapsules are ruptured and the lawsone is released into the damaged area where it forms a protective barrier on top of the underlying steel substrate. A carrier solvent is co-encapsulated with lawsone to provide a low viscosity, highly wetting solution that easily coats the steel surface. The carrier solvent then evaporates or diffuses away leaving behind a solid protective barrier of lawsone-metal complexes.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The terms "environmentally friendly", "environment-friendly", "environmentally benign", "eco-friendly", "nature-friendly", and "green" as used herein are terms referring to chemical and compositions that have reduced, minimal, or no harm (i.e., little or no toxicity) upon ecosystems or the environment relative to other chemicals and compositions that are being used for similar purposes.

Embodiments of the Invention

Various embodiments of this disclosure provide an environmentally friendly self-protecting barrier composition comprising:

a) a plurality of activatable microcapsules;
b) a corrosion inhibitor having negligible environmental toxicity, wherein the corrosion inhibitor is inside one or more of the activatable microcapsules; and
c) an environmentally benign polymerizable matrix that cures when coated on a substrate, wherein the activatable microcapsules are dispersed in the environmentally benign polymerizable matrix, the activatable microcapsules release the corrosion inhibitor when activated by physical damage to the activatable microcapsule, and the corrosion inhibitor in the environmentally benign polymerizable matrix provides an environmentally friendly self-protecting barrier composition that has negligible toxicity to the environment.

In various embodiments, the composition further comprises a metal substrate wherein the surface of the metal is coated with the self-protecting barrier. In additional embodiments, the corrosion inhibitor is lawsone, gallic acid, tannic acid, D-glucose, grape seed oil, linseed oil, jojoba oil, vitamin E, vitamin $B_{12}$, or a combination thereof. In yet other, the corrosion inhibitor is a metal complexing agent that complexes with a metal surface when released from the activatable microcapsule. In various other embodiments of this disclosure, the corrosion inhibitor is lawsone, and the lawsone forms a metal complex with the metal surface when released from the activatable microcapsule.

In some embodiments, the lawsone is dissolved in a solvent at about 1% to about 30% by weight. The amount of dissolved lawsone can also be about 0.1%, 0.5%, 2%, 5%, 10%, 15%, 20%, or 25%. In other embodiments, the corrosion inhibitor is dissolved in a solvent. In additional embodiments, the weight percent of the corrosion inhibitor in the solvent is about 1% to about 40%. The weight percent of corrosion inhibitor can also be about 0.1%, 0.5%, 2%, 5%, 10%, 15%, 20%, 25%, 30%, or 35%. In various other embodiments, the solvent is an alkyl acetate, aryl acetate, acetamide, a monosubstituted benzene, pyrrolidone, formamide, sulfoxide, or a combination thereof. In other additional embodiments, the weight percent of activatable microcapsules in the coating is about 5% to about 40%, and the coating is cured. The weight percent of activatable microcapsules in the coating can also be about 0.1%, 0.5%, 2%, 5%, 10%, 15%, 20%, 25%, 30%, or 35%.

In various additional embodiments of this disclosure, the polymerizable matrix is water-based or non-water based, and the non-water based polymerizable matrix comprises alkanes, esters, ethers, plant oils, essential oils, or a combination thereof. In other embodiments the non-water based polymerizable matrix comprises liquids, proteins, oils or waxes such as, but not limited to soybean oil, flaxseed oil, thistle oil, beeswax, linseed oil, citrus oil, liquid potassium silicate, and sheep milk casein. Other embodiments of liquids, proteins, oils or waxes that are used in this disclosure are non-volatile or have low volatility such that they are environmentally benign. A polymerizable matrix can also be a modified acrylic or latex paint having low volatility organic compounds (VOC). Additionally, A polymerizable matrix that is epoxy based has little or no VOC, and therefore are also deemed to be environmentally benign.

In other various embodiments, the polymerizable matrix is water-based, and the weight percent of water in the polymerizable matrix is about 10% to about 80%. The weight percent of water can also be about 15%, 20%, 25%, 30%, 35%, 40%, 45%, 50%, 55%, 60%, 65%, 70%, or 75%. In some additional embodiments, the polymerizable matrix comprises at least one epoxy resin and at least one curing agent, and the mass ratio of the epoxy resin relative to the curing agent is about 1:1 to about 5:1. The ratio can also be about 2:1, 1.5:1, 1:1, 1:2, 1:3, 1:4, 1:5, 1:6, 1:7, 1:8, or 1:9.

In yet other embodiments, the epoxy resin comprises bisphenol A, bisphenol F, phenol novolac, cresol novolac, glycidylamine, epichlorohydrin, epoxycyclohexane, glycidyl ether, or a combination thereof. In yet other embodiments, the curing agent comprises a polyamine, an anhydride, a polyphenol, a thiol, or a combination thereof.

In various additional other embodiments, the thickness of the coating is about 50 micrometers to about 200 micrometers, and the coating is cured. The thickness of the coating can also be about 25 50, 75, 100, 125, 150, 175, 200, 225, or 250 micrometers. In several other embodiments, the activatable microcapsules have a shell wall comprising of poly(urethane), poly(urea formaldehyde), polystyrene, poly(methyl methacrylate), polylactide, polyglycolic acid, polycaprolactone, poly(tetrahydrofuran), polyamide, or a combination thereof. In yet other embodiments, the activatable microcapsules have a shell wall thickness of about 400 to about 600 nanometers and a diameter of about 10 to about 50 micrometers. The shell wall thickness can also be about 300, 350, 400, 425, 450, 475, 500, 525, 550, 575, 600, 650, or 700 nanometers. The diameters if the microcapsule can be about 1-5 micrometers, about 5, 10, 15, 20, 25, 30, 35, 40, 45, 50, 55, or 60 micrometers.

This disclosure also provides various embodiments of a method of forming a corrosion inhibiting composite with the self-protecting barrier composition disclosed herein, the method comprising:

a) applying a coating of the self-protecting barrier composition to a metal substrate, wherein the corrosion inhibitor is a metal complexing agent; and
b) curing the self-protecting barrier to form a composite of the metal substrate and the cured self-protecting barrier;

wherein the activatable microcapsules in the cured self-protecting barrier release the corrosion inhibitor when a damaging event to the composite occurs, and wherein the released corrosion inhibitor complexes to the surface of the metal substrate upon contact, thereby inhibiting corrosion.

In various embodiments, the composite has a corrosion inhibition efficiency of about 20 percent to about 90 percent. In various additional embodiments, the metal substrate is stainless steel, carbon steel, alloy steel, or mild steel. This inhibition efficiency can also be about 25%, 30%, 35%, 40%, 45%, 50%, 55%, 60%, 65%, 70%, 75%, 80%, 85%, 90%, or 95%.

The self-protecting coating of the present disclosure can deliver anticorrosive agents that are able to inhibit corrosion on the substrate in contact with the self-protecting coating. When a crack forms in the self-protecting coating, a portion of the anti-corrosive agents flow into the crack, contacting the substrate and inhibiting corrosion.

The coating composition can comprise a polymer matrix and a plurality of microcapsules dispersed in the polymer matrix. The mass ratio of microcapsules relative to the total mass of the mixture of precursor after solidifying can be about 0.2:1 to 0.05:1, 0.2:1 to 0.1:1, and 0.2:1 to 0.15:1, or 0.2:1 to 0.18:1.

The polymer matrix can comprise an epoxy precursor, a curing agent and water. The mass ratio of the epoxy precursor relative to the curing agent relative to water can be 16:2:1 to 5:2:1, 10:2:1 to 5:2:1, 7.5:2:1 to 5:2:1, and 6:2:1 to 5:2:1.

In one aspect, the present disclosure comprises a self-protecting microcapsule, the microcapsule comprising at least one shell wall and at least one core, wherein the core comprises at least one anticorrosive agent and at least one solvent.

The solvent in the core of the self-protecting microcapsule can be any solvent or combinations of solvents that can dissolve the appropriate amount of the anticorrosive agent in the core. The solvents can include, but are not limited to, hexyl acetate, ethyl phenyl acetate, methyl phenyl acetate, toluene, chlorobenzene, nitrobenzene, N-Methyl-2-pyrrolidone, dimethylacetamide, dimethylformamide and dimethyl sulfoxide.

The mass ratio of the anticorrosive agent relative to the solvent can be 20:1 to 0.05:1, 5:1 to 0.05:1, 1:1 to 0.05:1, and 0.5:1 to 0.05:1.

The present disclosure also provides a self-protecting coating comprising a plurality of microcapsules described herein dispersed throughout a polymer matrix.

The present disclosure also provides a method of protecting a substrate including contacting a coating composition with a substrate and solidifying the coating composition. The coating composition includes an epoxy precursor, curing agent, water and a plurality of microcapsules.

Results and Discussion

Microcapsule Characterization

Figure 4A:
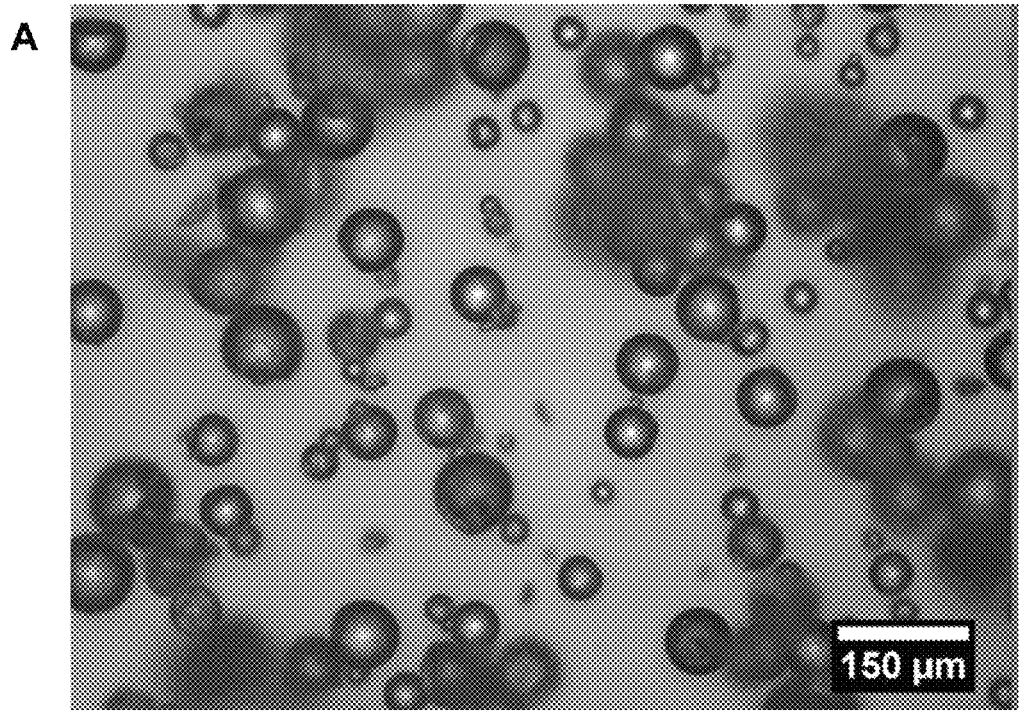
FIG. 4A-4D. Characterization of microcapsules. (a) Optical image of microcapsules as prepared. (b)SEM image of a capsule cross-section embedded in epoxy. (c) Histogram of capsule diameter as measured from optical images. (d) Capsule shell wall thickness measured from SEM cross-sectional imaging.
Figure 4B:
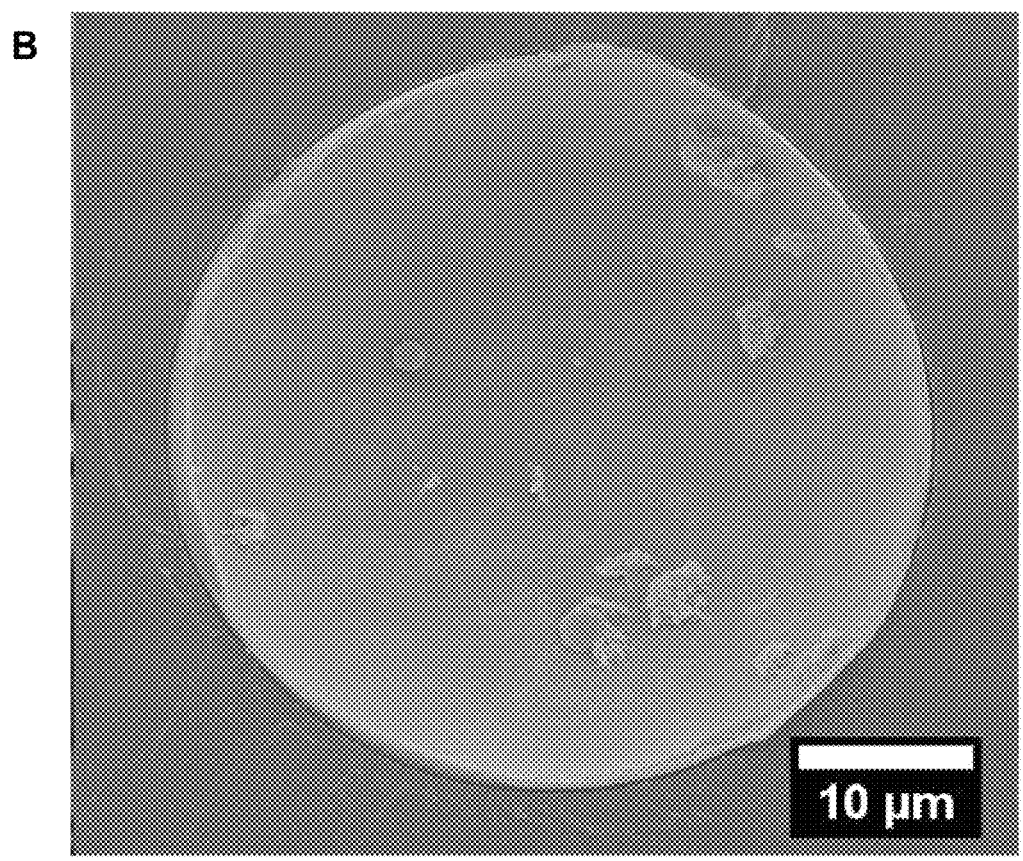
Figure 4C:
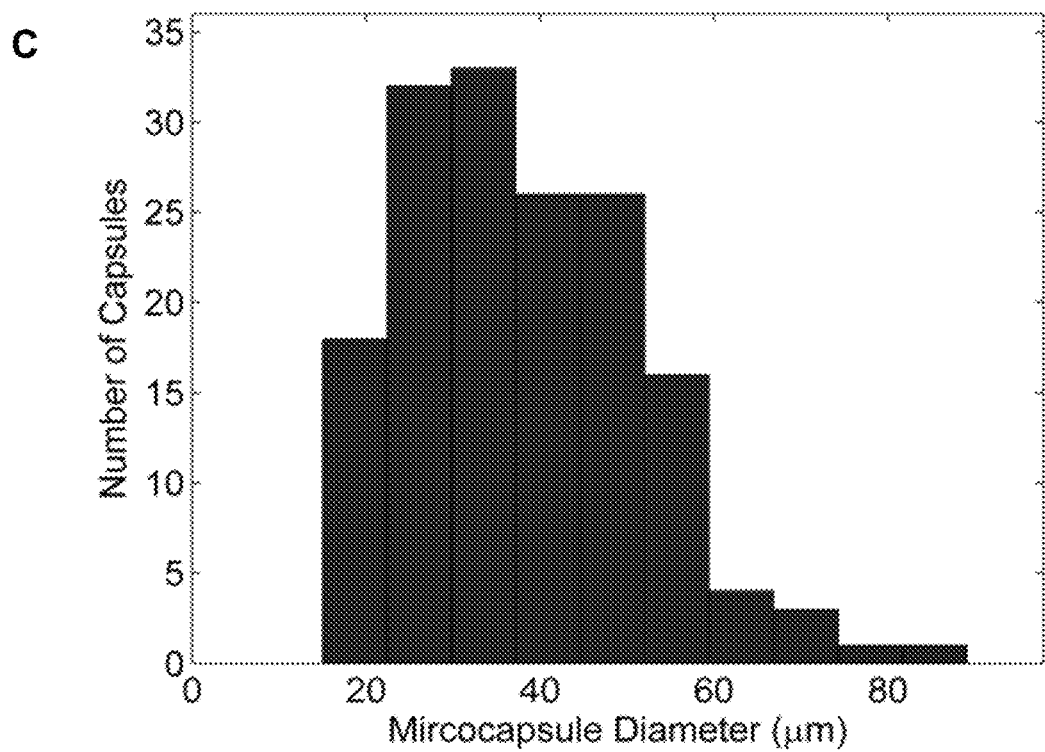
Figure 4D:
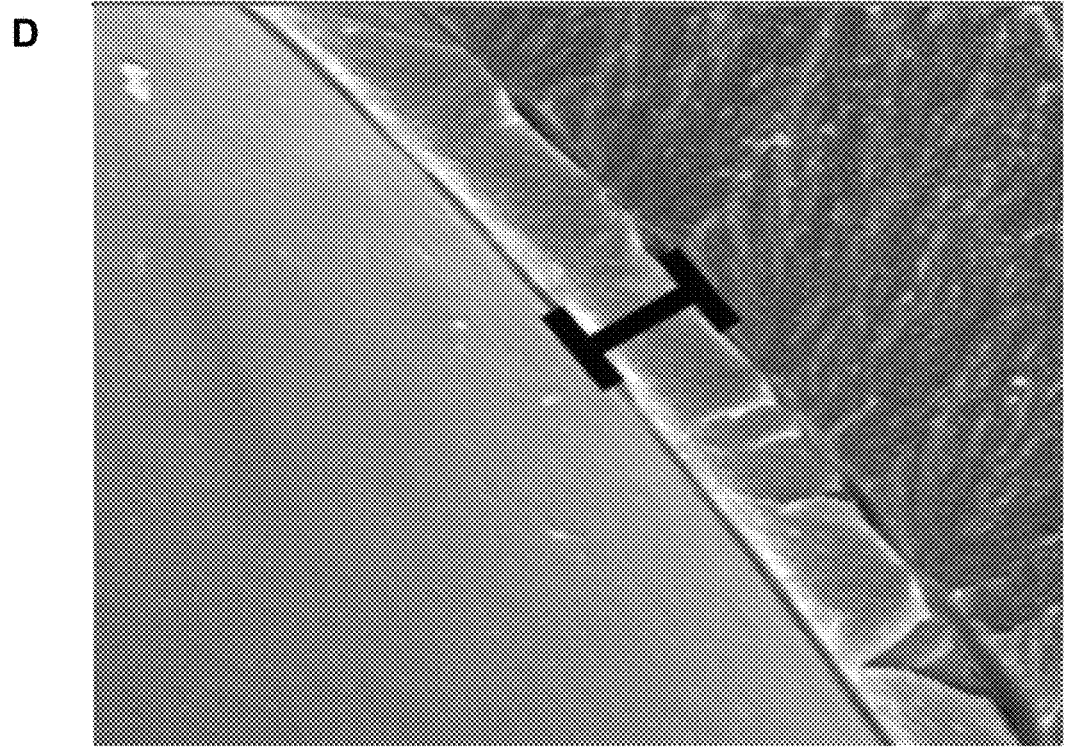

Optical (FIG. 4A) and SEM cross section (FIG. 4B) images of microcapsules were used to measure the average capsule diameter (FIG. 4C) and shell wall thickness (FIG. 4D) respectively. SEM cross section images were taken after the microcapsules were embedded in an epoxy (Epofix) and freeze-fractured to view the capsule cross section. The average capsule diameter was 30±9.5 µm, and the measured shell wall thickness was 510±110 nm.

UV-vis was used to measure the lawsone content of the extracted capsule core (FIG. 5B) using the procedure outlined in the Examples. The theoretical lawsone content encapsulated was calculated and is equal to the amount of lawsone initially added into the encapsulation reaction. The UV-vis analysis indicates that there is a maximum amount of lawsone that can be encapsulated as indicated by the deviation of type 10 and 20 microcapsules from the theoretical prediction. This is likely due to a concentration dependent nucleation of the solute (lawsone) as described by LaMer (*Industrial and Engineering Chemistry*, 1952, 44 (6), 1270).

Figure 6:
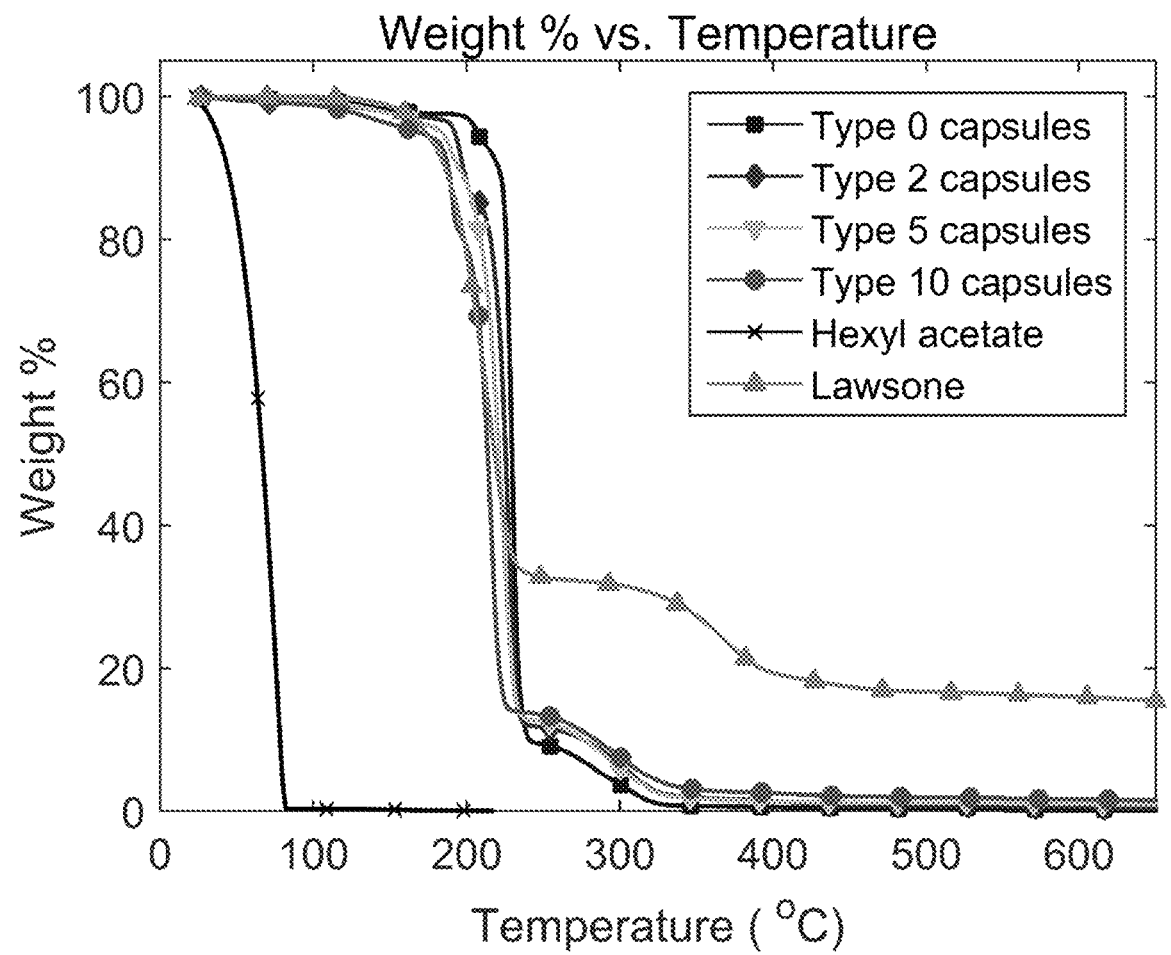
FIG. 6. TGA results of type 0, 2, 5, and 10 microcapsules along with pure core materials.
Figure 7A:
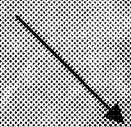
FIG. 7A-7D. Optical (a and b) with a false colored corrosion product and SEM (c and d) images of the corroded samples after submersion in the NaCl solution for 5 days. (a, c) Coatings containing 20 wt % type 0 capsules (b, d) Coatings containing 20 wt % type 10 capsules.
Figure 7B:
Figure 7C:
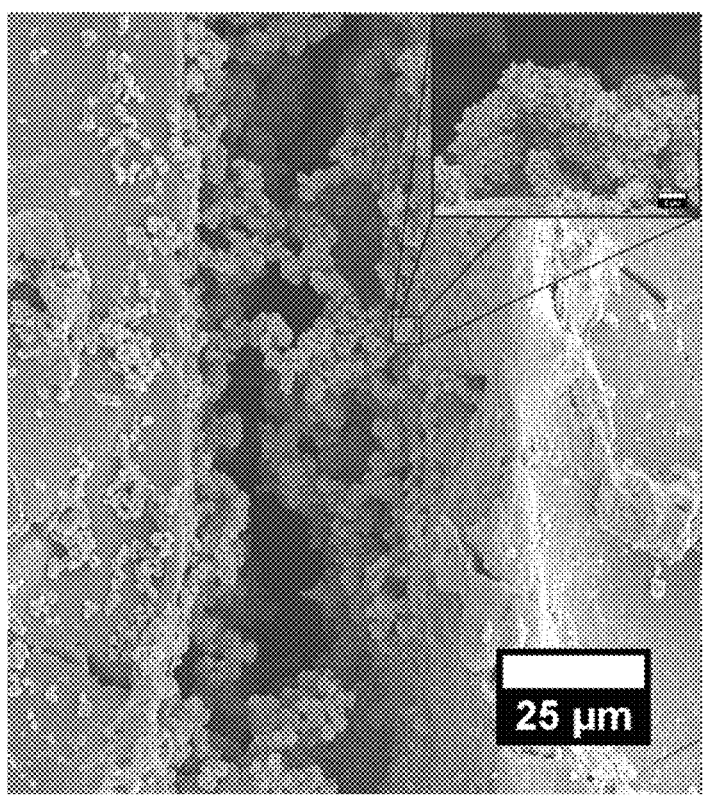
Figure 7D:
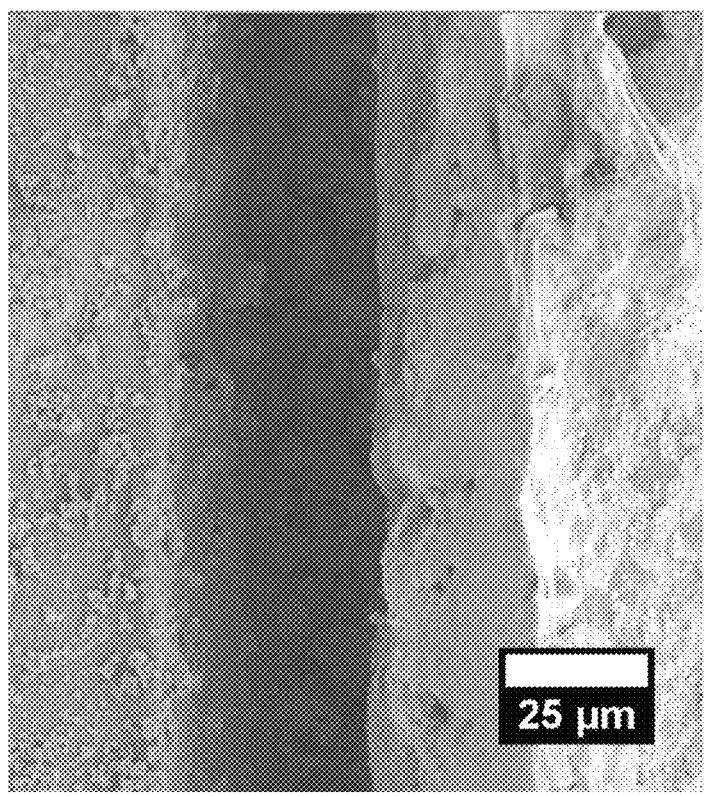

Representative TGA results are shown in FIG. 6. The microcapsules exhibit no appreciable weight loss before 200 oC indicating good thermal stability. Degradation of the shell wall material occurs thereafter followed by rapid weight loss. Notably, the carrier solvent (hexyl acetate) evaporates well before 100° C. while type 0 capsules are stable until nearly 230° C. indicating successful encapsulation of the core material. The trace for neat lawsone shows that a thermally stable residual mass exists above 400° C. Comparing type 0 with the other microcapsule types the residual mass above 400° C. in types 2, 5, and 10 capsules confirms the presence of lawsone in the core material.

Self-Protecting Results

Optical and SEM images were taken of coating samples after they were submerged in a 5 wt % NaCl solution for five days (FIG. 7). FIG. 7A and FIG. 7C are images of a control coating with type 0 capsules, and FIG. 7B and FIG. 7D are images of a self-protecting coating with type 10 microcapsules. The optical images show that the corrosion product has not spread as far in the self-protecting coating when compared to the control coating. Similarly, there are significantly less corrosion product crystals (FIG. 7C) seen in the SEM image of the self-protected coating.

Figure 8:
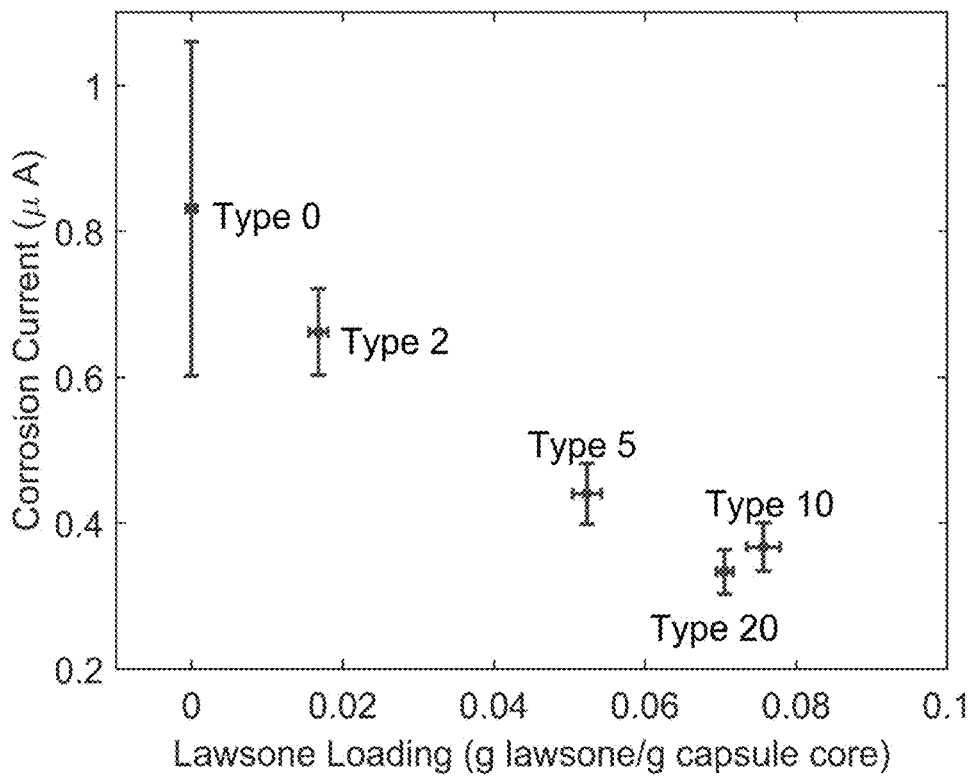
FIG. 8. Corrosion current as a function of lawsone loading for coatings containing 20 wt % microcapsules. The labeling on the plot indicates the type of microcapsules used in each coating sample.
Figure 9:
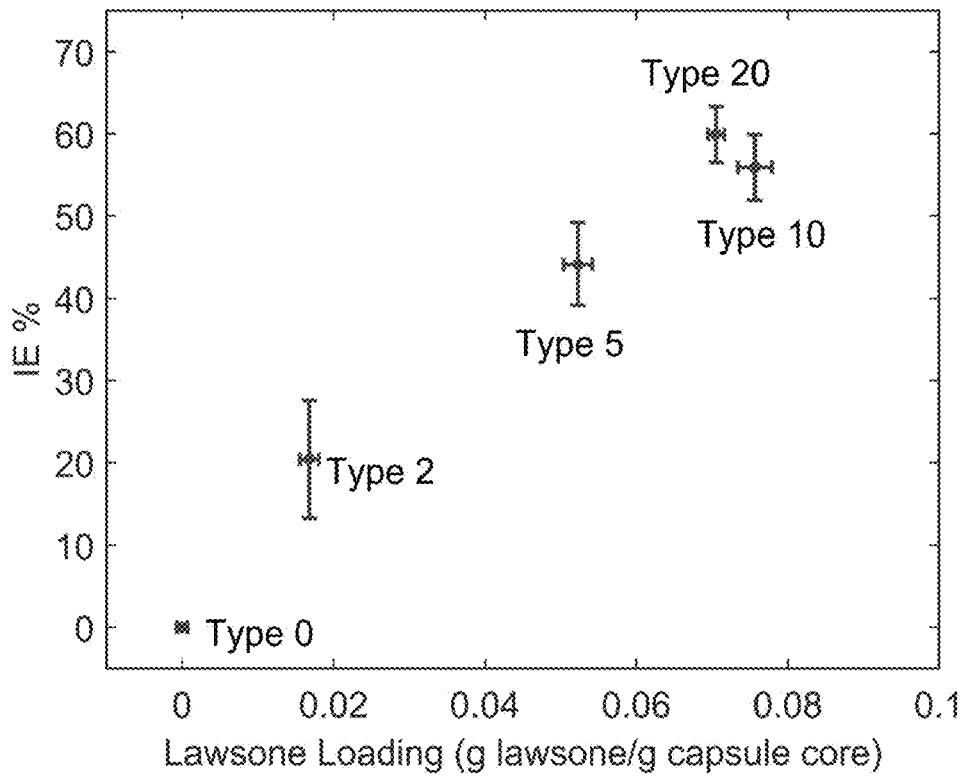
FIG. 9. Inhibition efficiency as a function of lawsone loading for coating containing 20 wt % microcapsules. The labeling on the plot indicates the type of microcapsules used in each coating sample.

The open circuit potential ($E_{oc}$) and the corrosion current ($I_{corr}$) from the EC analysis are shown in Table 1 for the previously described coating samples containing the five types of microcapsules. The increasing open circuit potential with an increasing amount of lawsone in the microcapsules indicates an anodic type inhibition. The corrosion current is also plotted vs. lawsone loading in FIG. 8. The corrosion current decreases with an increasing lawsone content in the microcapsules indicating less corrosion of the substrate. FIG. 9 shows the inhibition efficiency (IE %) as calculated by Equation 1 of coatings containing the five capsule types. Coatings with type 10 and 20 microcapsules had a similar lawsone content and a similar anticorrosion performance. Both capsule types had an inhibition efficiency of almost 60%. Both plots of corrosion current and inhibition efficiency reveal that the amount of corrosion decreases almost linearly with an increasing lawsone concentration within the microcapsules. The amount of lawsone that can be encapsulated is the limiting factor that prevents a better anticorrosion performance with this protection scheme.

TABLE 1

Corrosion potential and corrosion current of coatings containing 20 wt % of various types of microcapsules.

| Capsule Type | $E_{oc}$ (mV) | $I_{corr}$ (µA) |
|---|---|---|
| Type 0 | −604.23 ± 15.07 | 0.83 ± 0.22 |
| Type 2 | −585.72 ± 34.24 | 0.66 ± 0.06 |
| Type 5 | −546.55 ± 8.64 | 0.44 ± 0.04 |

TABLE 1-continued

Corrosion potential and corrosion current of coatings containing 20 wt % of various types of microcapsules.

| Capsule Type | $E_{oc}$ (mV) | $I_{corr}$ (µA) |
|---|---|---|
| Type 10 | −545.82 ± 13.46 | 0.36 ± 0.03 |
| Type 20 | −550.48 ± 3.82 | 0.33 ± 0.03 |

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1

Materials

The microencapsulation materials gum arabic, hexyl acetate, and lawsone were purchased from Sigma Aldrich (St. Louis, Mo., USA) and were used as received. The microcapsule shell wall material was prepared from a polyurethane prepolymer (Desmodur L 75) provided by Bayer MaterialsScience. Hot rolled steel substrates following ASTM A569 were purchased from Metals Depot (Winchester, Ky.). The epoxy coating consisted of Epirez resin 6520-WH-53 and Epikure curing agent 6870-W-53, and were obtained from Chemical Marketing Concepts Inc.

Example 2

Microcapsule Fabrication

The microencapsulation procedure was modified from Mangun et al. (Polymer, 2010, 51 (18), 4063). The surfactant gum arabic (9 g) was slowly dissolved in 80 ml of deionized (DI) water in a 400 mL beaker. The core solution consisting of 40 g hexyl acetate together with a range of concentrations of lawsone was mixed with 5.0 g of polyurethane prepolymer (shell wall) in a separate beaker. The core solution was then slowly added to the water and surfactant solution while undergoing mechanical agitation with a 51 mm diameter low shear mixing blade at 1200 RPM. Mixing was allowed to continue for two hours at 85° C. in a temperature controlled water bath.

The resulting capsules were allowed to float in a separatory funnel and rinsed in deionized (DI) water until the solution was clear and free of excess lawsone. The microcapsules were then freeze dried to remove all excess water. The naming convention and lawsone content of the core solution for microcapsules that were fabricated for this study are listed in Table 2.

TABLE 2

Types of microcapsules fabricated.

| Designation | Lawsone concentration of core solution (wt % w.r.t. capsule core) |
|---|---|
| Type 0 | 0 |
| Type 2 | 2 |
| Type 5 | 5 |

TABLE 2-continued

Types of microcapsules fabricated.

| Designation | Lawsone concentration of core solution (wt % w.r.t. capsule core) |
| --- | --- |
| Type 10 | 10 |
| Type 20 | 20 |

Example 3

Capsule Core Analysis

The final lawsone content of the encapsulated core material was determined by extracting the core material and performing UV-vis spectroscopy of the sample. Using a calibration curve (FIG. 10), the lawsone content can be calculated from the measured peak absorbance of the extracted capsule core material. Thermogravimetric analysis (TGA) was performed on both microcapsules and isolated core materials to determine thermal stability by heating to 650° C. at a rate of 10° C./min.

Example 4

Coating Preparation and Damage Protocol

Steel substrates measuring 30.5 by 10.0 by 0.5 cm were prepared prior to the coating application. The substrates were sandblasted to a \white metal blast" according to ASTM D7055-09 with 180 grit aluminum oxide blast media. They were cleaned with compressed air to remove all excess grit, rinsed in acetone to remove dirt and oils, and then let air dry at room temperature. The epoxy coating was then applied with a micrometer controlled doctor blade. The epoxy coating mixture consisted of four components. The first two were a stoichiometric mixture of Epirez resin 6520-WH-53 and Epikure curing agent 6870-W-53 (weight ratio of 10:4). Both the resin and curing agent are 53 wt % solids and 47 wt % water. To this mixture, 2 grams of DI water was added for every 10 grams of Epirez resin for viscosity modification. The final component was 20 wt % microcapsules with respect to the epoxy solids mass (resin and curing agent). Coatings containing microcapsules with no lawsone (type 0) were prepared as a control, and the self-protecting coatings with lawsone filled microcapsules contained up to 20 wt % lawsone. The applied coating material was cured for 24 hours at 35° C. Fully cured coatings were then damaged with a corrocutter (Erichsen 639) affixed with a razor blade to inflict uniform scribe damage to the coating. After damage, the coatings were subjected to ultrasonic, visual, and electrochemical measurements.

Example 5

Ultrasonic Analysis

An ultrasonic transmission (UT) analysis was completed in pulse-echo mode to measure the coating thickness. A custom transducer with a frequency of 80 MHz and focal length of 1 cm was used. The sampling frequency was 1 GHz, and the spot size of the transducer at the focal point was 60 μm. The speed of sound within the coating material was first determined. The speed of sound of the epoxy coating and the microcapsule embedded epoxy coating were 2800 and 2600 m/s, respectively.

Figure 3A:
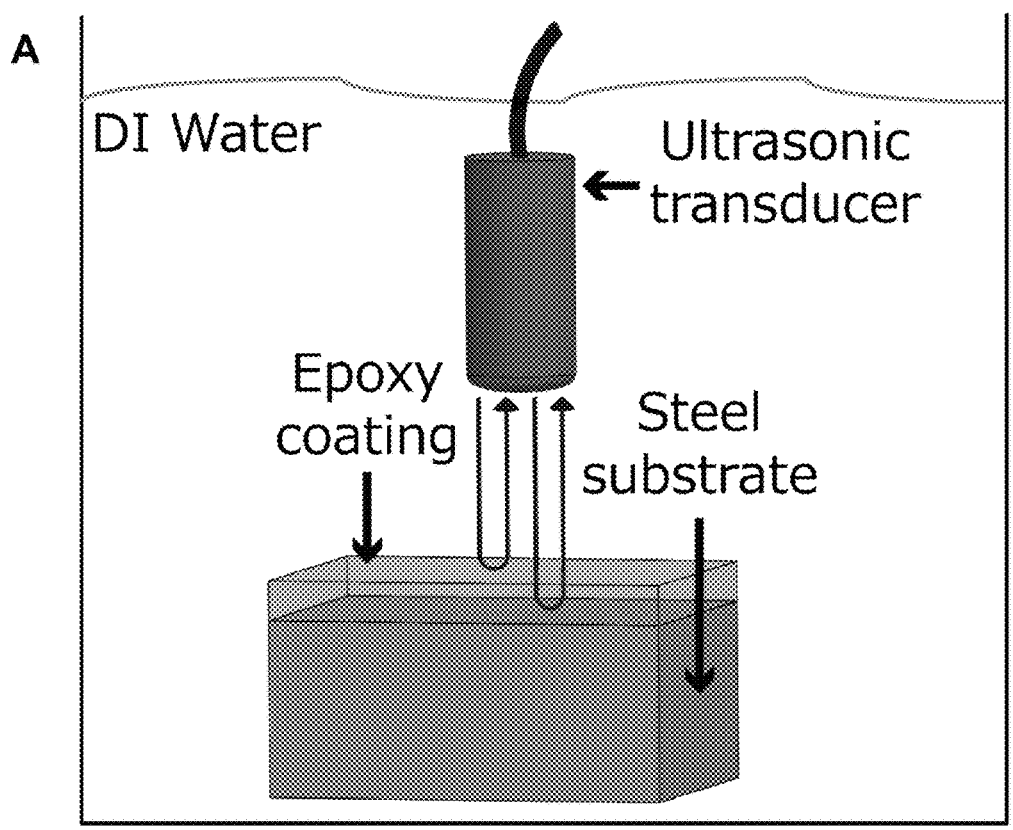
FIG. 3A-3B. (a) The ultrasonic analysis setup. (b) The electrochemical test cell with three electrodes and a 5 wt % NaCl electrolyte. The coated steel substrate acts as the working electrode, a platinum wire serves as the counter electrode, and a silver/silver chloride serves as the reference electrode.

A schematic of the UT setup is seen in FIG. 3A. The steel substrate, epoxy coating, and ultrasonic transducer were all submerged in a degassed and DI water tank. As the transducer is above the coating sample, the time difference between the transducer signal reflection between the water/coating interface and the coating/steel interface was measured.

Samples were placed in a water tank (degassed and DI) and the time difference of the signal between the water/coating interface and the coating/steel interface was measured. The thickness of the coating was then calculated using the measured speed of sound of the coating material. A full field thickness plot of the sample (FIG. 14) was acquired by x-y scanning of the transducer and from this data the average thickness and standard deviation were calculated.

As a comparison, coating samples were also cross-sectioned and polished. The coating thickness was measured with a scanning electron microscope (SEM) in this case. The ultrasonic and SEM thickness measurements were in good agreement. The thickness of the coatings used in this work had a cured thickness of 120±11:8 μm.

Example 6

Electrochemical and Visual Characterization

Figure 3B:
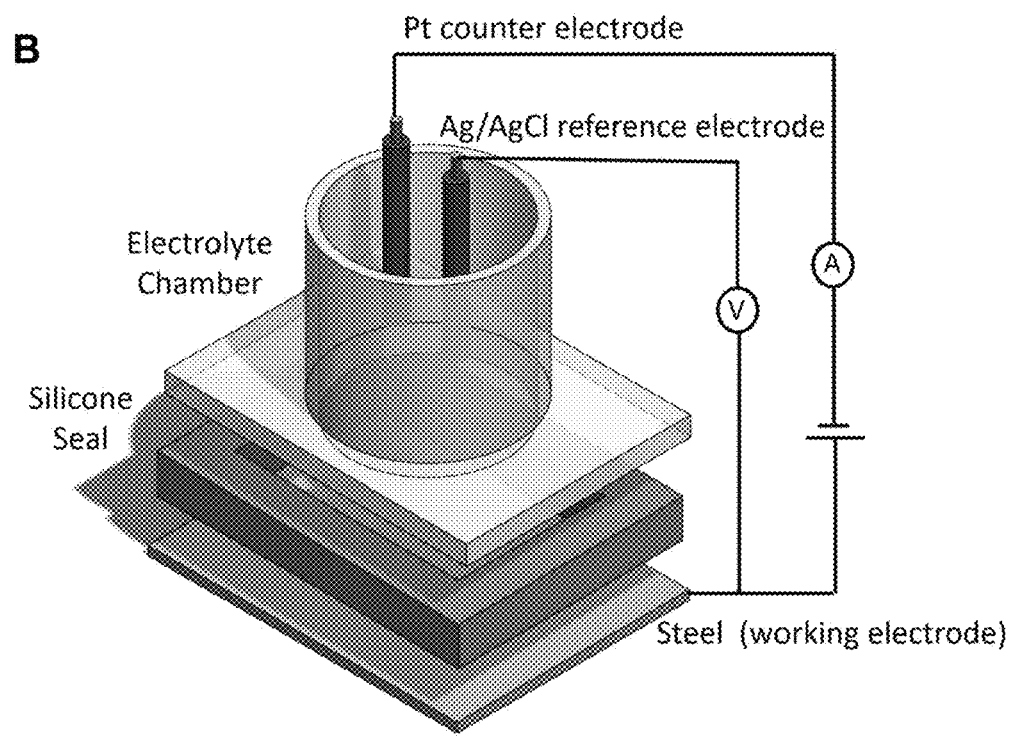

The electrochemical (EC) analysis was completed in a specially designed test cell shown schematically in FIG. 3B. The coated steel substrate was damaged and then placed beneath the electrolyte chamber. The entire cell was clamped to provide a sealed cell for analysis. A 5 wt % NaCl solution was used as the electrolyte. The cell consists of three electrodes with the steel substrate as the working electrode, a platinum wire as the counter electrode and a silver/silver chloride reference electrode.

Example 7

Linear Polarization Measurements

Linear polarization measurements were performed with a Bio-Logic VSP potentiostat to measure the amount of corrosion. The open circuit potential was first measured for twenty minutes, then a stepwise voltage from −0.1 to 0.1 Volts at a rate of 0.2 mV/s was applied with respect to the open circuit voltage and the current measured throughout.

Tafel extrapolation was used to determine the corrosion current associated with steady state corrosion. The corrosion current for the control ($I_o$) and self-protecting samples ($I_i$) was measured and used to calculate the inhibition efficiency (IE %), $$IE\% = (I_o - I_i)/I_o * 100\% \quad (eq.\ 1).$$

The inhibition efficiency provides a quantitative metric for cultivating the performance of a self-protecting coatings through the reduction in corrosion current.

Example 8

Visual Analysis

A similar test cell was used for visual analysis, except the top of the electrolyte chamber was closed to prevent evaporation of the electrolyte solution. The electrolyte solution (5 wt % NaCl in DI water) was loaded into the cell and the samples were left submerged in the solution for 5 days. Afterwards, both optical and SEM imaging was performed on the test samples.

Example 9

UV-Vis Analysis

Figures 10A, 10B:
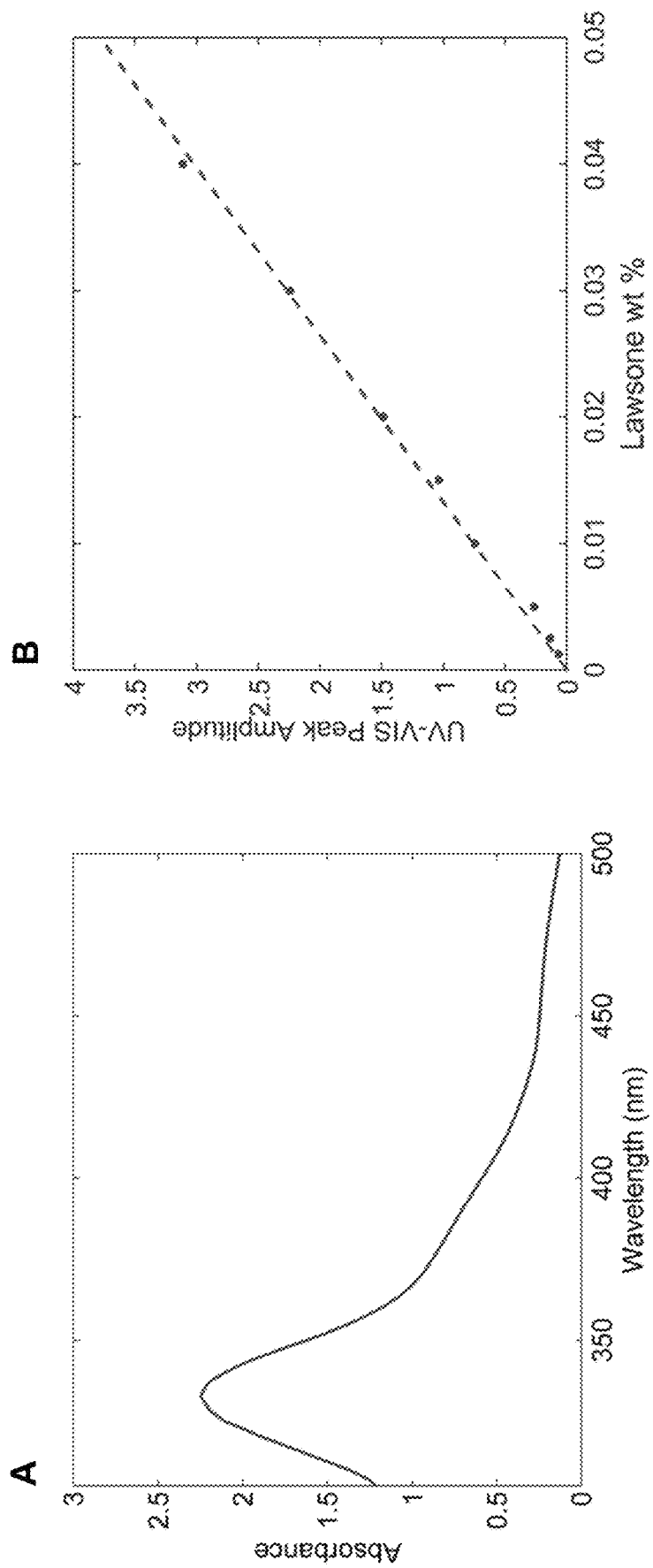
FIG. 10A-10B. (a) Lawsone absorbance spectra by UV-vis. (b) UV-vis calibration curve of peak amplitude at 333 nm vs. the known lawsone concentration in methanol.
Figure 11:
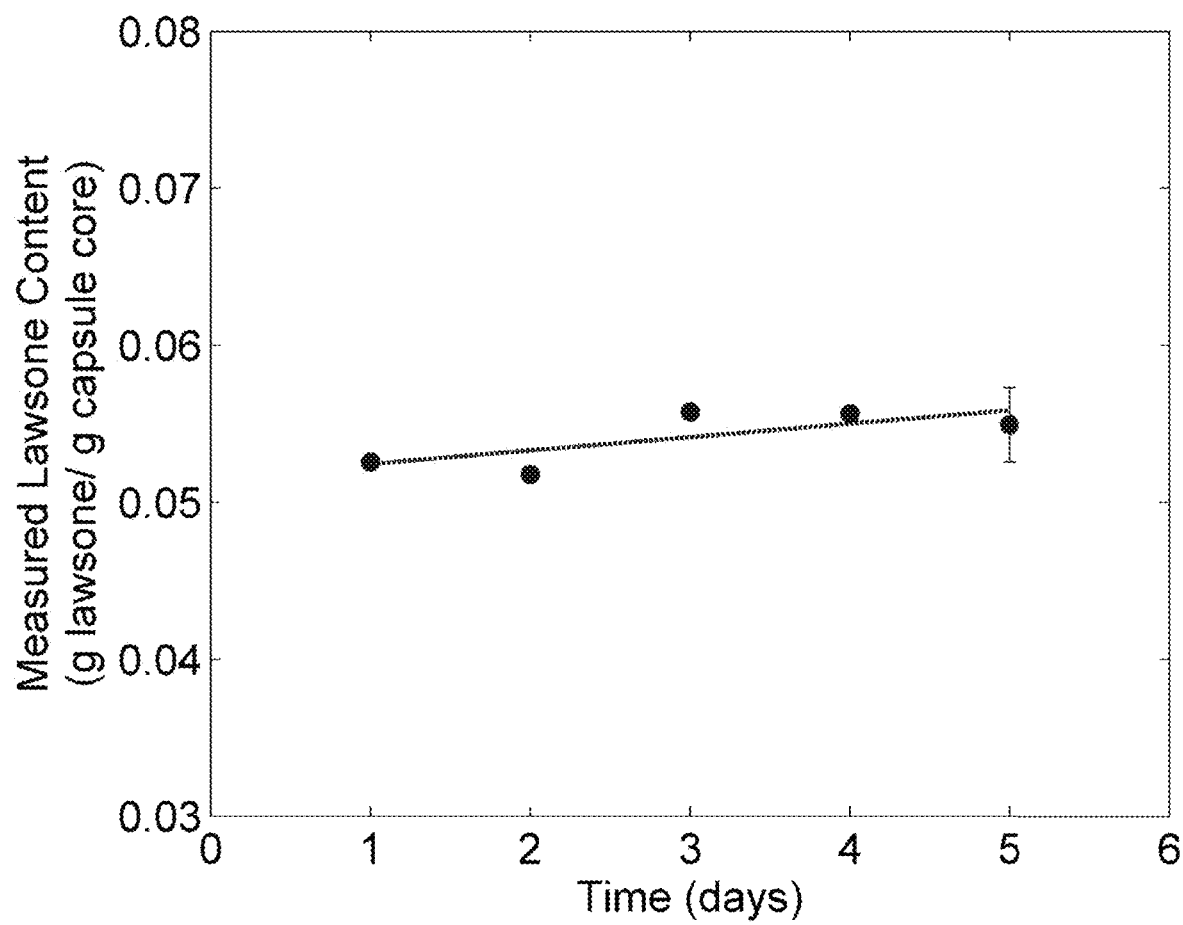
FIG. 11. Time dependent absorbance measurement of type 5 microcapsules. No significant increase was seen after the third day of submersion in methanol.

UV-vis spectroscopy was completed on various amounts of lawsone dissolved in methanol to determine the amount of lawsone contained within the microcapsules. A representative absorbance spectrum is shown in FIG. 10A. The peak has a wavelength of 333 nm. The calibration curve (FIG. 10B) was made by mixing known concentrations of lawsone in methanol and measuring the corresponding absorbance peak. Microcapsule core extraction samples were made by submerging 50 mg of microcapsules in 18 mL of methanol for five days. This ratio of capsules to methanol was used to give an absorbance peak within the measurable range of the instrument. Five days was chosen as a sufficient extraction time based on initial experiments with type 5 capsules, in which no significant increase in the lawsone content was detected after three days (FIG. 11). The dashed line is a line of best_t and the error bar on the fifth day is one standard deviation. After the 5 days, the methanol solution was passed through a 0.4 µm syringe filter to remove all debris. UV-vis was then completed on the extracted core, and the lawsone concentration was calculated based on the calibration curve.

Figures 5A, 5B:
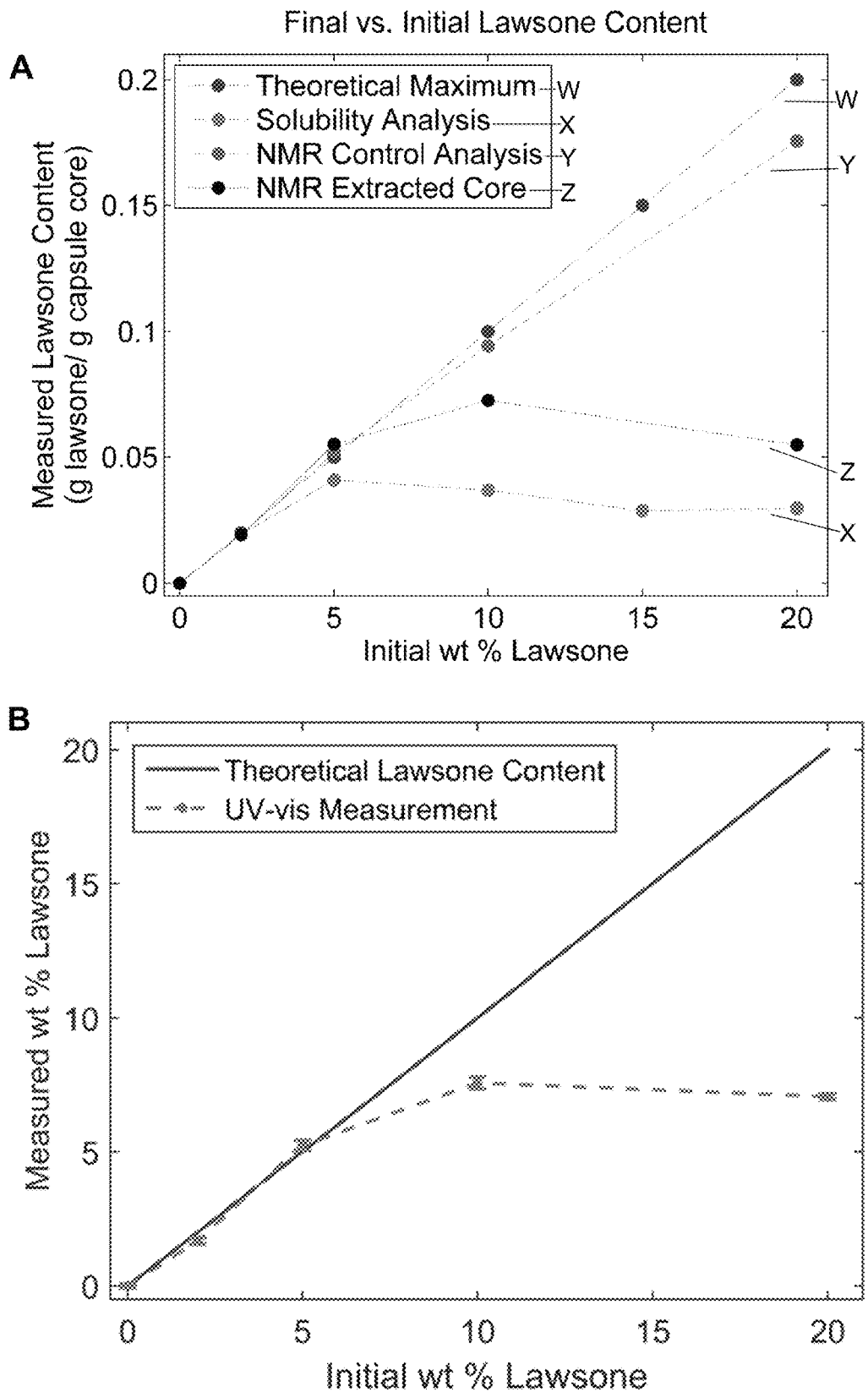
FIG. 5A-5B. (a) Lawsone content from the solubility analysis, NMR of extracted capsule core, and the theoretical lawsone content for capsules with different initial lawsone concentrations. (b) Lawsone content of microcapsules as measured by UV-vis analysis.

With the known concentration, the lawsone weight percent was calculated and shown in FIG. 5B and Table 3.

TABLE 3

UV-vis measured absorbance peak values.

| Capsule Type | Absorbance Peak | Lawsone wt % |
|---|---|---|
| Type 0 | 0.00 ± 0.015 | 0.01 ± 0.07 |
| Type 2 | 0.37 ± 0.027 | 1.68 ± 0.12 |
| Type 5 | 1.14 ± 0.044 | 5.23 ± 0.19 |
| Type 10 | 1.65 ± 0.049 | 7.56 ± 0.22 |
| Type 20 | 1.54 ± 0.025 | 7.06 ± 0.11 |

Example 10

Speed of Sound Measurement

A free-standing sample of the coating material with arbitrary thickness was fabricated by spraying a glass substrate with a PTFE release spray prior to the coating application. The epoxy coating mixture was applied to the glass substrate and fully cured. After the curing procedure, the coating material was easily separated from the glass substrate.

Figures 12A, 12B:
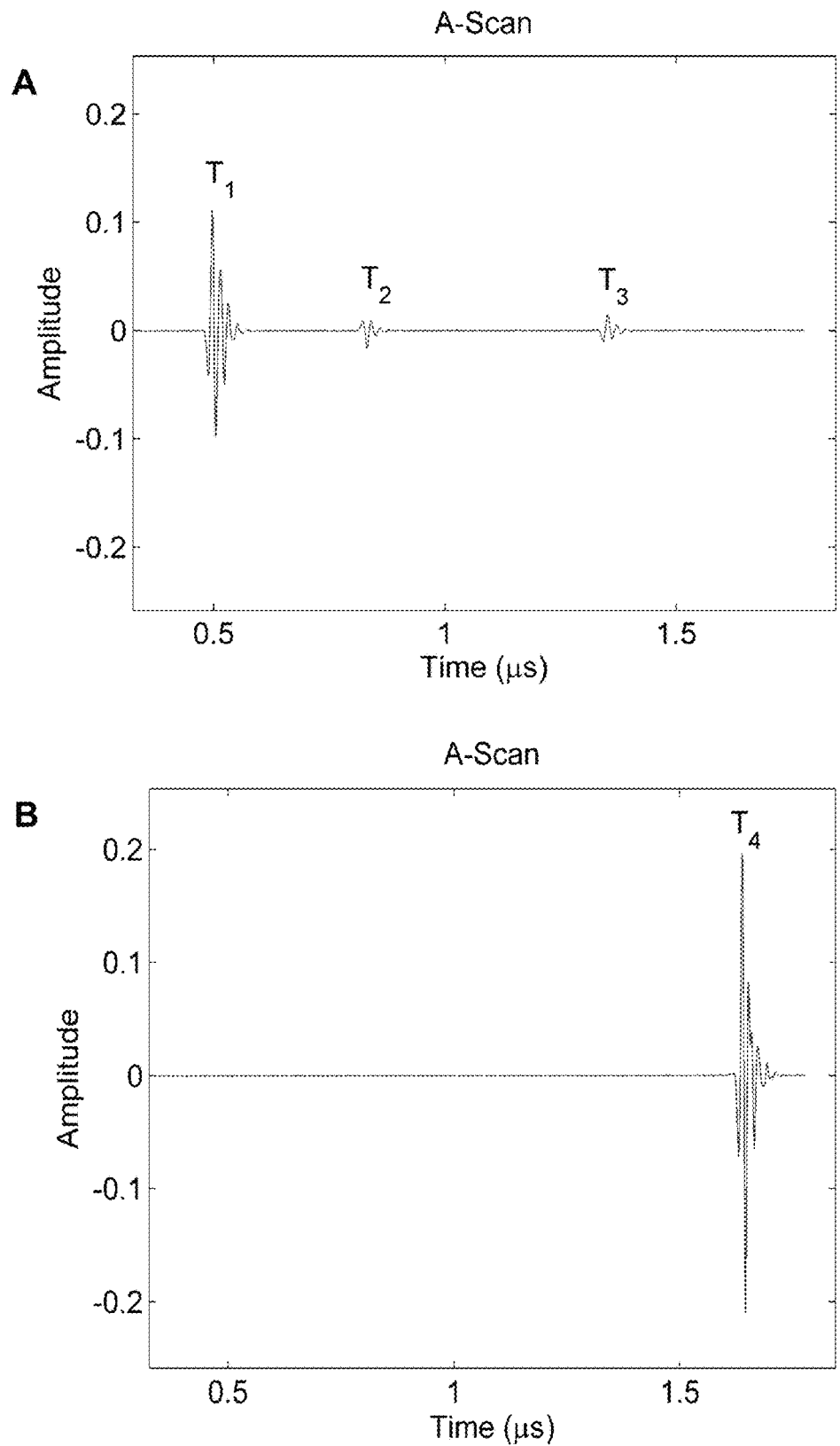
FIG. 12A-12B. (a) The ultrasonic signal through the free-standing epoxy sample. (b) The ultrasonic signal of the tank bottom to be used as reference.

A pulse-echo analysis was completed on the free-standing samples. FIG. 12 shows representative A-scans of the ultrasonic signal through the free-standing sample (a) and of the reflected signal from the bottom of the water tank for a signal that does not pass through the sample (b). T1 and T2 are the times associated with the reflections from the top and bottom surface of the epoxy sample. T3 is the time associated with the tank bottom reflection after it has passed through the sample. T4 is the time associated with the tank bottom reflection of the ultrasonic signal that has not passed through the sample. Using the speed of sound in water (c), the thickness of the sample (d) is calculated by $d=(cT_4-cT_1-c(T_3-T_2))/2$. The speed of sound ($\upsilon$) of the epoxy was then calculated by $\upsilon=2*d/(T_2-T_1)$ and used for thickness measurements. This point-wise analysis was completed over a large area of the sample and the velocity values were averaged. The average speed of sound for the epoxy was 2800 m/s without capsules and was 2600 m/s for the epoxy sample with 20 wt % type 0 microcapsules.

Example 11

Thickness Analysis by Ultrasound and Scanning Electron Microscopy

Figure 13:
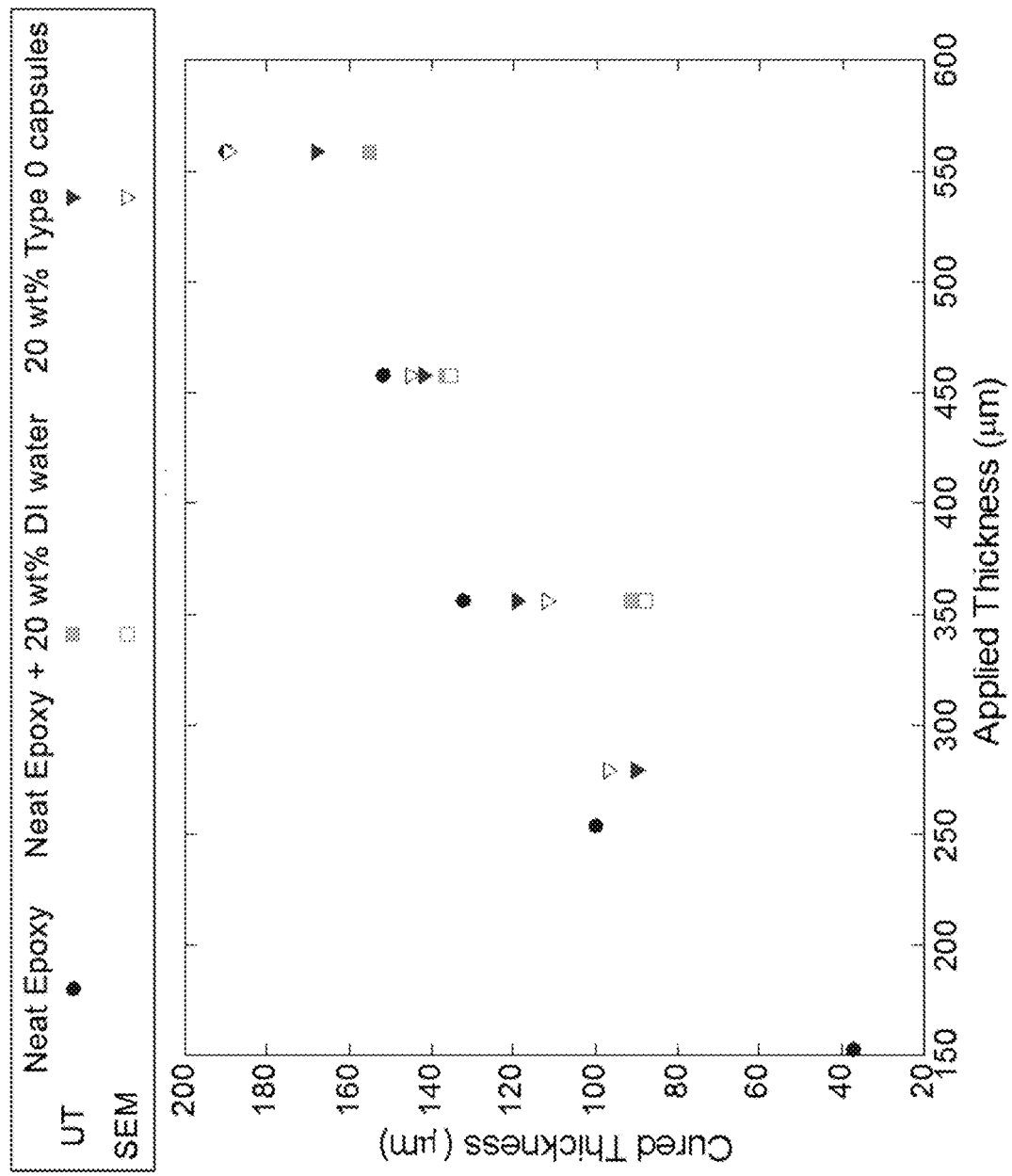
FIG. 13. Cured thickness as a function of applied thickness for various samples. All samples were fabricated with a stoichiometric mixture of Epirez resin 6520-WH-53 and Epikure curing agent 6870-W-53 containing 53% solids and 47% water. An additional 20 wt % DI water was added for viscosity modification. Thickness measurements were made by ultrasonic testing (UT) or by SEM imaging of coating cross-sections.

The coating material as applied is 47% water. As such, the fully cured coating thickness is much different from the applied thickness. FIG. 13 shows that the difference between cured and applied thickness is quite significant. In some cases, the cured thickness is less than 30% of the applied thickness due largely to the evaporation of water.

Figure 14:
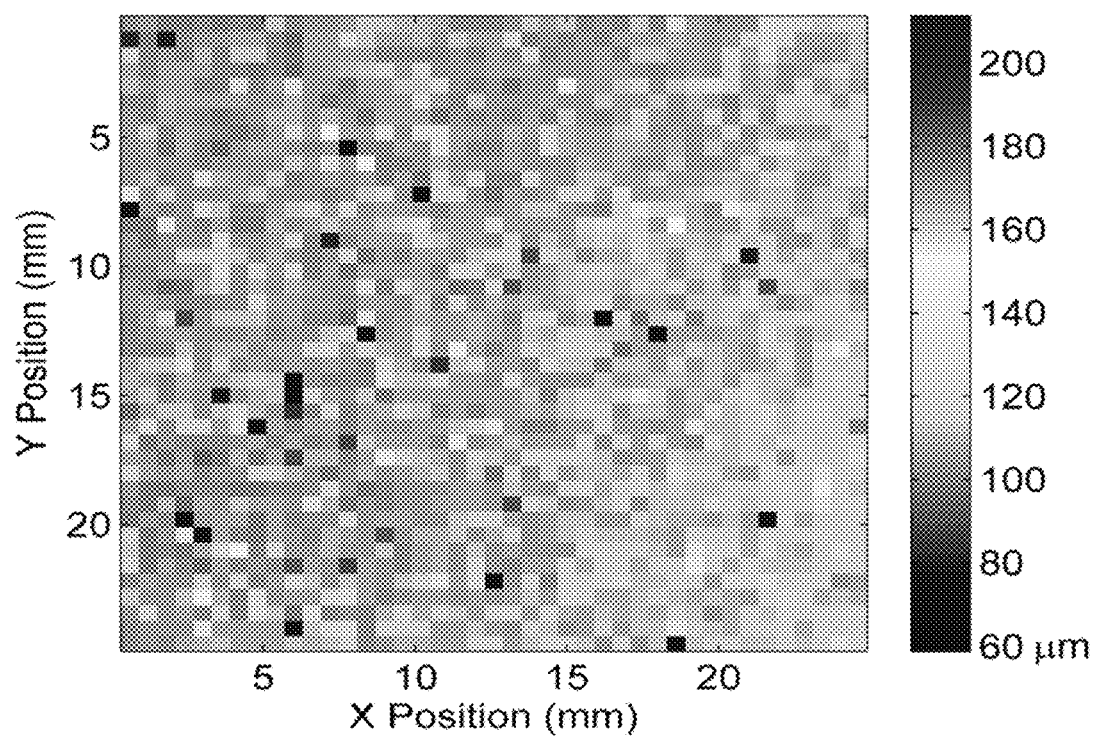
FIG. 14. Full field thickness plot of an epoxy coating with 20 wt % type 0 microcapsules. The average thickness of this coating is 118±8.5 μm.
Figure 15:
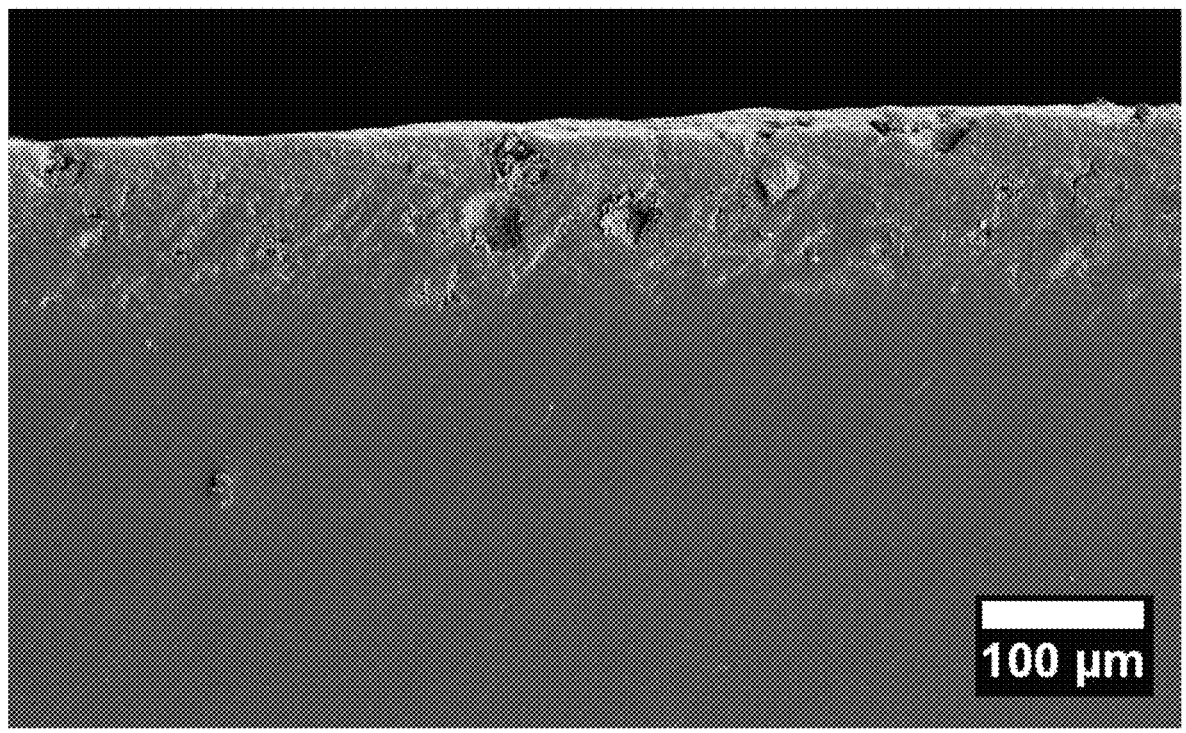
FIG. 15. SEM cross section image of an epoxy coating with 20 wt % type 0 microcapsules. The thickness of this coating is 110 μm.

A sample SEM comparison image is seen in FIG. 15. FIG. 14 and FIG. 15 are images of epoxy coatings with 20 wt % type 0 capsules. Both coatings were applied at 355 µm and were allowed to fully cure. FIG. 14 is a full field thickness plot of the coating. This specific coating has an average thickness of 118±8:5 µm. FIG. 15 shows a cross section of the coating after it has been polished. This specific coating has a thickness of 110 µm.

Example 12

NMR Spectra and Analysis

Solubility tests of lawsone in hexyl acetate were completed to help determine a maximum amount of lawsone that could be encapsulated. Various amounts of lawsone were dispersed in hexyl acetate. The samples were heated to 85° C. for two hours under mechanical stirring by a magnetic stir bar. This process simulates the encapsulation temperatures and durations. While the mixture was still hot, undissolved lawsone was removed with a Whatman 42 filter paper and weighed to calculate the maximum amount of lawsone dissolved in the hexyl acetate. The lawsone content of the microcapsule core was determined by subjecting the extracted capsule core to nuclear magnetic resonance (NMR) spectroscopy. Using octane as a standard, the amount of lawsone in the capsules was determined by the ratio of the integrals of the lawsone and octane peak areas.

NMR spectra were recorded on Varian Unity 500 NB spectrometer. The NMR samples were prepared by dissolving the extracted capsule core samples in deuterated methanol ($CD_3OD$). Known amounts of octane ($CH_3(CH_2)_6CH_3$) were added as an internal reference for quantitative analysis. The mass of lawsone was calculated with Equation 2 and as outlined by Huang et al (*J. Pharmaceutical and Biomedical Analysis*, 2014, 88, 1). Subscripts "o" denote the octane parameter and subscripts "L" denote the lawsone parameter. P is the number of contributing protons, A is the area of the contributing peaks, $M_w$ is the molecular weight, and M is the mass of the samples. The number of contributing protons and molecular weights for lawsone and octane were 4 and 18, and 174.15 and 114.23 g/mol respectively. The NMR results are detailed in Table 4, FIG. 5A.

$$M_L = (P_o/P_L) \times (A_L/A_o) \times (M_{wL}/M_{wo}) \times M_o \times 100\% \quad \text{(eq. 2)}$$

TABLE 4

NMR area and mass values.

| Initial Lawsone | Lawsone Area | Octane Area | Octane Mass (mg) | Lawsone Mass (mg) |
|---|---|---|---|---|
| 0% Lawsone Capsules | 0 | — | 5.1 | 0 |
| 2% Lawsone Capsules | 4.05 | 75.64 | 4.5 | 1.64 |
| 2 mg Lawsone Control | 3.94 | 83.17 | 5.9 | 1.91 |
| 5% Lawsone Capsules | 4.06 | 26.19 | 4.4 | 4.68 |
| 5 mg Lawsone Control | 4.12 | 19.58 | 3.8 | 5.48 |
| 10% Lawsone Capsules | 4.01 | 38.77 | 8.7 | 6.17 |
| 10 mg Lawsone Control | 4.07 | 34.12 | 5.9 | 9.81 |
| 20% Lawsone Capsules | 4.09 | 52.95 | 8.8 | 4.66 |
| 20 mg Lawsone Control | 4.07 | 34.12 | 8.7 | 19.15 |

Conclusions

Self-protective epoxy coatings were fabricated with 20 wt % microcapsules containing the henna extract lawsone together with a carrier solvent hexyl acetate. The epoxy coating material was water-based and contained no VOCs. Compiled with the "green" plant extract anti-corrosive agent, the coating system introduced here is a safer and more environmentally benign alternative to current coating systems used commonly in industry. Self-protecting coatings showed less corrosion in both visual and SEM imaging after exposure to 5 wt % NaCl solution. Increasing lawsone content in microcapsules led to a nearly linear reduction in corrosion current and increase in inhibition efficiency as measured by electrochemical analysis. Coatings fabricated with the highest lawsone content of 0.08 g/g capsule core exhibited 60% inhibition efficiency.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A self-protecting barrier composition consisting of:
   a) a plurality of activatable microcapsules;
   b) a corrosion inhibitor, wherein the corrosion inhibitor is lawsone;
   c) a carrier solvent consisting of an alkyl acetate, wherein both the corrosion inhibitor and the carrier solvent are disposed within each of the plurality of the activatable microcapsules, and the corrosion inhibitor is dispersed within the carrier solvent; and
   d) a polymerizable matrix, the plurality of activatable microcapsules dispersed in the polymerizable matrix to form the self-protecting barrier that is cured after coating a surface of a substrate to form a cured self-protecting barrier on the substrate;
   wherein the plurality of activatable microcapsules releases the corrosion inhibitor and the carrier solvent when activated by physical damage to the cured self-protecting barrier such that the corrosion inhibitor covers the surface of the substrate to inhibit corrosion.

2. The self-protecting barrier composition of claim 1 wherein the surface of the substrate is a surface of a metal substrate.

3. The self-protecting barrier composition of claim 2 wherein the corrosion inhibitor is a metal complexing agent that complexes with the surface of the metal substrate when released from the plurality of the activatable microcapsules.

4. The self-protecting barrier composition of claim 3 wherein the lawsone is dissolved in the carrier solvent at about 1% to about 30% of the total weight of the carrier solvent and the lawsone.

5. The self-protecting barrier composition of claim 2 wherein the lawsone is dissolved in the carrier solvent.

6. The self-protecting barrier composition of claim 5 wherein the weight percent of the lawsone is about 1% to about 40% of the total weight of the carrier solvent and the lawsone.

7. The self-protecting barrier composition of claim 5 wherein the weight percent of the plurality of the activatable microcapsules in the cured coating is about 5% to about 40% of the total weight of the cured coating.

8. The self-protecting barrier composition of claim 5 wherein the polymerizable matrix is water-based, and the weight percent of water in the polymerizable matrix is about 10% to about 80% of the total weight of the polymerizable matrix without the activatable microcapsules.

9. The self-protecting barrier composition of claim 5 wherein the polymerizable matrix comprises at least one epoxy resin and at least one curing agent, and the mass ratio of the at least one epoxy resin relative to the at least one curing agent is about 1:1 to about 5:1.

10. The self-protecting barrier composition of claim 9 wherein the at least one epoxy resin is bisphenol A epoxy, bisphenol F epoxy, phenol novolac epoxy, cresol novolac epoxy, glycidylamine, epichlorohydrin, epoxycyclohexane, glycidyl ether, or a combination thereof.

11. The self-protecting barrier composition of claim 10 wherein the at least one curing agent is a polyamine, an anhydride, a polyphenol, a thiol, or a combination thereof.

12. The self-protecting barrier composition of claim 5 wherein the plurality of the activatable microcapsules have a shell wall comprising poly(urethane), poly(urea formaldehyde), polystyrene, poly(methyl methacrylate), polylactide, polyglycolic acid, polycaprolactone, poly(tetrahydrofuran), polyamide, or a combination thereof.

13. The self-protecting barrier composition of claim 12 wherein the plurality of the activatable microcapsules have a shell wall thickness of about 400 to about 600 nanometers and a diameter of about 10 to about 50 micrometers.

14. The self-protecting barrier composition of claim 1 wherein the thickness of the cured coating is about 50 micrometers to about 200 micrometers.

15. A method of forming a corrosion inhibiting composite with the self-protecting barrier composition of claim 1 comprising:
   a) applying a coating of the self-protecting barrier composition to a metal substrate, wherein the corrosion inhibitor is a metal complexing agent; and
   b) curing the self-protecting barrier to form a composite of the metal substrate and the cured self-protecting barrier;
   wherein the activatable microcapsules in the cured self-protecting barrier release the corrosion inhibitor when a damaging event to the composite occurs, and wherein the released corrosion inhibitor complexes to the surface of the metal substrate upon contact, thereby inhibiting corrosion.

16. The method of claim 15 wherein the composite has a corrosion inhibition efficiency of about 20 percent to about 90 percent.

17. The method of claim 16 wherein the metal substrate is stainless steel, carbon steel, alloy steel, or mild steel.

18. A self-protecting barrier composition consisting of:
a) a plurality of activatable microcapsules;
b) a corrosion inhibitor, wherein the corrosion inhibitor is lawsone;
c) a carrier solvent, wherein the carrier solvent is an alkyl acetate, both the corrosion inhibitor and the carrier solvent are disposed within each of the plurality of the activatable microcapsules, the corrosion inhibitor comprising from 2% to 20% of the total weight of the carrier solvent and the lawsone; and
d) a water-based polymerizable matrix consisting of water, an epoxy resin and one or more curing agents, wherein the plurality of activatable microcapsules is dispersed in the water-based polymerizable matrix to form the self-protecting barrier that is cured after coating a metal substrate such that after the curing, a thickness of the cured self-protecting barrier is 30% or less than a thickness of the self-protecting barrier prior to the curing; and
wherein, the plurality of activatable microcapsules in the cured self-protecting barrier releases the corrosion inhibitor and the carrier solvent when activated by physical damage to the cured self-protecting barrier, and the corrosion inhibitor complexes with the metal substrate after release from the damaged activatable microcapsules to inhibit corrosion.

* * * * *